(12) United States Patent
Jung (10) Patent No.: US 8,421,743 B2
(45) Date of Patent: Apr. 16, 2013

(54) FLAT PANEL DISPLAY AND MOBILE DEVICE USING THE SAME

(75) Inventor: Youn-Hwan Jung, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 371 days.

(21) Appl. No.: 12/904,089

(22) Filed: Oct. 13, 2010

(65) Prior Publication Data

US 2011/0187692 A1    Aug. 4, 2011

(30) Foreign Application Priority Data

Feb. 1, 2010  (KR) .......................... 10-2010-0009248

(51) Int. Cl.
*G09G 3/36*  (2006.01)
*G02F 1/1333*  (2006.01)
*G09F 13/04*  (2006.01)

(52) U.S. Cl.
USPC ............................. 345/102; 349/58; 362/97.2

(58) Field of Classification Search .................. 345/102; 349/58; 362/97.2
See application file for complete search history.

(56) References Cited

U.S. PATENT DOCUMENTS

| | | | | |
|---|---|---|---|---|
| 2010/0186271 A1* | 7/2010 | Zheng | ............................. | 40/453 |
| 2012/0169944 A1* | 7/2012 | Kuromizu | ....................... | 349/61 |

FOREIGN PATENT DOCUMENTS

| | | | |
|---|---|---|---|
| JP | 10-333128 A | 12/1998 | |
| KR | 10-0264923 B1 | 9/2000 | |
| KR | 1020050022057 A | 3/2005 | |
| KR | 10-2005-0099426 A | 10/2005 | |
| KR | 10-2006-0101689 A | 9/2006 | |
| KR | 10-2006-0111076 A | 10/2006 | |
| KR | 10-2008-0058796 A | 6/2008 | |
| KR | 1020080084445 A | 9/2008 | |
| KR | 10-0893619 B1 | 4/2009 | |
| KR | 10-2009-0074404 A | 7/2009 | |

OTHER PUBLICATIONS

Korean Notice of Allowance dated Jan. 19, 2012 for Korean Patent Application No. KR 10-2010-0009248 which corresponds to captioned U.S. Appl. No. 12/904,089.

Korean Office Action dated May 27, 2011 for Korean Patent Application No. KR 10-2010-0009248 which corresponds to captioned U.S. Appl. No. 12/904,089.

\* cited by examiner

*Primary Examiner* — Kevin M Nguyen
(74) *Attorney, Agent, or Firm* — Knobbe, Martens, Olson & Bear LLP (57) ABSTRACT

A flat panel display for reducing damage to a panel assembly from a falling impact is disclosed. In one embodiment, the display includes: 1) a liquid crystal panel assembly configured to display an image and 2) a backlight assembly including i) a light source configured to provide light to the liquid crystal panel assembly, ii) a flexible printed circuit board (FPCB) configured to provide power for the light source to generate the light, and iii) a light guide panel configured to guide the light received from the light source. The display may further include 1) a mold frame surrounding the flexible printed circuit board, 2) a chassis accommodating the mold frame and 3) a weight unit formed in at least one of the chassis and mold frame, wherein the weight unit is formed at a place that is eccentric with respect to the center of the liquid crystal panel assembly.

20 Claims, 10 Drawing Sheets

FLAT PANEL DISPLAY AND MOBILE DEVICE USING THE SAME

RELATED APPLICATIONS

This application claims priority to and the benefit of Korean Patent Application No. 10-2010-0009248 filed in the Korean Intellectual Property Office on Feb. 1, 2010, the entire contents of which are incorporated herein by reference.

BACKGROUND

1. Field

The described technology generally relates to a flat panel display and a mobile device using the same.

2. Description of the Related Technology

Flat panel displays have been reduced in size and weight due to developments in semiconductor technology. Two popular types of flat panel displays includes liquid crystal (LCD) and organic light emitting diode (OLED) displays. These displays have advantages of reduced size, light weight, and low power consumption over cathode ray tube (CRT) technology. Thus, they are currently widely used for mobile devices, such as cellular phones and portable digital assistants (PDA).

SUMMARY

One inventive aspect is a flat panel display for reducing damage to a liquid crystal panel or an organic light emitting panel assembly from a falling impact, and a mobile device using the same.

Another aspect is a flat panel display including: a liquid crystal panel assembly for displaying an image; a backlight assembly including a light source for supplying light to the liquid crystal panel assembly, a flexible printed circuit board (FPCB) for generating light by attaching the light source, and a light guide panel for guiding the light emitted by the light source; a mold frame for reflecting light that has leaked to a side of the light guide panel and surrounding the flexible printed circuit board; and a chassis for receiving the mold frame. The mold frame includes a weight unit that is formed at a place that is eccentric from the middle of the liquid crystal panel assembly.

The weight unit is protruded toward the chassis in the rear of the mold frame where the light source is provided.

The chassis forms a combining groove corresponding to the weight unit to be combined with the weight unit.

The weight unit includes a first weight unit and a second weight unit that are protruded toward the chassis from both width-direction ends of the flexible printed circuit board.

The chassis forms a first combining groove and a second combining groove corresponding to the first weight unit and the second weight unit so as to be combined with the first weight unit and the second weight unit, respectively.

The weight unit is a rectangular parallelepiped, and the combining groove is formed as an incised groove corresponding to a second side of at least one weight unit.

The weight unit is protruded as an oblique line from the front to the rear of the mold frame, and the combining groove is formed as an incised groove corresponding to a second side of the weight unit.

Another aspect is a flat panel display including: a liquid crystal panel assembly for displaying an image; a backlight assembly including a light source for supplying light to the liquid crystal panel assembly, a flexible printed circuit board (FPCB) for generating light by attaching the light source, and a light guide panel for guiding the light emitted by the light source; a mold frame for reflecting light that has leaked to a side of the light guide panel and surrounding the flexible printed circuit board; and a chassis for receiving the mold frame, wherein the chassis includes a weight unit that is formed at a place that is eccentric from the middle of the liquid crystal panel assembly.

The weight unit is attached to an external surface of the chassis in the rear of the chassis where the light source is provided.

The weight unit is formed along the external surface of the chassis and is protruded above a bottom of the chassis.

Another aspect is a flat panel display including: an organic light emitting panel assembly including a display area and a pad area; and a chassis combined with the organic light emitting panel assembly, wherein the chassis includes a weight unit that is formed at a place that is eccentric from the middle of the organic light emitting panel assembly.

The weight unit is attached to an external surface of a side wall of the chassis in the rear of the chassis where the pad area is provided.

The weight unit is formed along the external surface of the chassis and is protruded above the bottom of the chassis.

Yet another embodiment provides a mobile device including the flat panel display, and a body including an installing groove for installing the flat panel display.

In the body, the flat panel display and the surface of the installing groove form a buffer space therebetween.

The mobile device further includes a buffer member provided in the buffer space.

The body further includes another weight unit for increasing the eccentricity in addition to a weight unit that is formed in the flat panel display.

Another aspect is a flat panel display comprising: a liquid crystal panel assembly configured to display an image; a backlight assembly including i) a light source configured to provide light to the liquid crystal panel assembly, ii) a flexible printed circuit board (FPCB) configured to provide power for the light source to generate the light, and iii) a light guide panel configured to guide the light received from the light source; a mold frame surrounding the flexible printed circuit board; a chassis accommodating the mold frame; and a weight unit formed in at least one of the chassis and mold frame, wherein the weight unit is formed at a place that is eccentric with respect to the center of the liquid crystal panel assembly.

In the above display, the weight unit is formed only in the mold frame. In the above display, the weight unit protrudes toward the chassis in the rear of the mold frame where the light source is formed. In the above display, a combining groove is defined in the chassis, wherein the combining groove corresponds to the weight unit and is configured to at least partially receive the weight unit.

In the above display, the weight unit comprises a first weight unit and a second weight unit that protrudes toward the chassis from both width-direction ends of the flexible printed circuit board. In the above display, first and second combining grooves are defined in the chassis, and wherein the first and second combining grooves are configured to at least partially receive the first and second weight units, respectively.

In the above display, the weight unit has a rectangular parallelepiped shape, and wherein the combining groove is formed as an incised groove corresponding to a side of the weight unit. In the above display, the weight unit is protruded as an oblique line from the front to the rear of the mold frame, and wherein the combining groove is formed as an incised groove corresponding to a side of the weight unit. In the above display, the light source is attached to the flexible printed circuit board, and wherein the mold frame is configured to reflect light that has leaked from a side of the light guide panel. In the above display, the weight unit is formed only in the chassis.

In the above display, the weight unit is attached to an external surface of the chassis in the rear of the chassis where the light source is formed. In the above display, the weight unit is formed along the external surface of the chassis and is protruded above a bottom of the chassis.

Another aspect is a flat panel display comprising: an organic light emitting panel assembly including a display area and a pad area; a chassis configured to support the organic light emitting panel assembly; and a weight unit formed in the chassis to be eccentric with respect to a weight center of the organic light emitting panel assembly. In the above display, the weight unit is attached to an external surface of a side wall of the chassis in the rear of the chassis where the pad area is formed. In the above display, the weight unit is formed along the external surface of the chassis and is protruded above the bottom of the chassis.

Another aspect is a mobile device comprising: a flat panel display comprising i) a display panel assembly, ii) a support structure configured to support the display panel assembly and iii) a weight unit formed in the support structure to be eccentric with respect to a weight center of the display panel assembly; and a body configured to accommodate the flat panel display.

In the above device, an installing groove is defined in the body, wherein the installing groove of the body is configured to receive the display panel assembly, and wherein a buffer member is interposed between the flat panel display and a surface of the installing groove. The above device further comprises an additional weight unit formed in the body, wherein the additional weight unit is configured to increase the eccentricity.

In the above device, the display panel assembly is a liquid crystal panel assembly, wherein the support structure comprises a mold frame and a chassis, and wherein the weight unit is formed in at least one of the chassis and mold frame. In the above device, the display panel assembly is an organic light emitting panel assembly, wherein the support structure comprises a chassis, and wherein the weight unit is formed in the chassis.

DETAILED DESCRIPTION

A liquid crystal display (LCD) generally includes i) a liquid crystal panel assembly for displaying images, ii) a flexible printed circuit board (FPCB) for generating light with light emitting diodes, iii) a light guide panel (LGP) for spreading light of the light emitting diodes, iv) a reflection sheet for reflecting the light leaking below the light guide panel and v) an optical sheet for improving luminance and visibility of the light on the light guide panel. It may also include i) a mold frame for fixing the liquid crystal panel assembly and reflecting the light leaking to the side and ii) a chassis for receiving the mold frame and maintaining the overall strength. The mold frame surrounds the reflection sheet, the optical sheet, and the flexible printed circuit board (FPCB).

An organic light emitting diode (OLED) display is self-emissive and displays an image with organic light emitting elements. This type of display generally includes i) an organic light emitting panel assembly for forming organic light emitting elements, ii) a chassis combined to the rear part of the panel assembly, and iii) a printed circuit board (PCB) electrically connected to the panel assembly through the flexible printed circuit board (FPCB).

In general, the mold frame and the chassis of these displays matches the mass center and the shape center with the center of one of the liquid crystal panel or the organic light emitting panel assembly. Therefore, if the LCD, the OLED display or the mobile device is dropped on the ground, the falling impact is transmitted to the assembly through the impacted portion. This will likely cause the panel assembly to vibrate or bend, which may cause it to crack or incur other damage.

Exemplary embodiments will be described more fully hereinafter with reference to the accompanying drawings. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

As examples, a flat panel display includes a liquid crystal display (LCD) including a liquid crystal panel assembly and an organic light emitting diode (OLED) display including an organic light emitting panel assembly. Therefore, the liquid crystal display (LCD) will be exemplified in the first to third exemplary embodiments, and the organic light emitting diode (OLED) display will be exemplified in the fourth exemplary embodiment.

Figure 1:
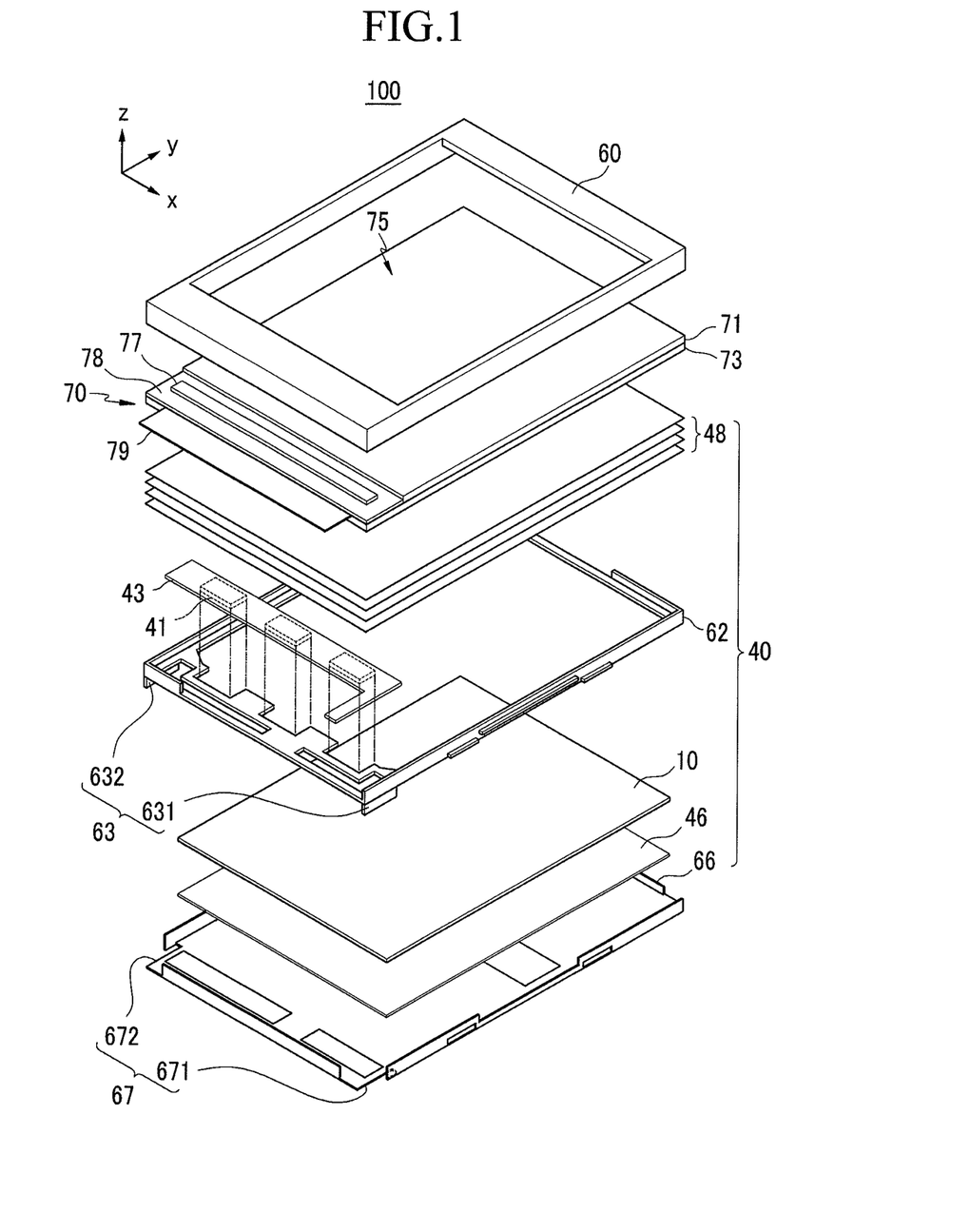
FIG. 1 shows an exploded perspective view of a flat panel display according to a first exemplary embodiment.
Figure 2:
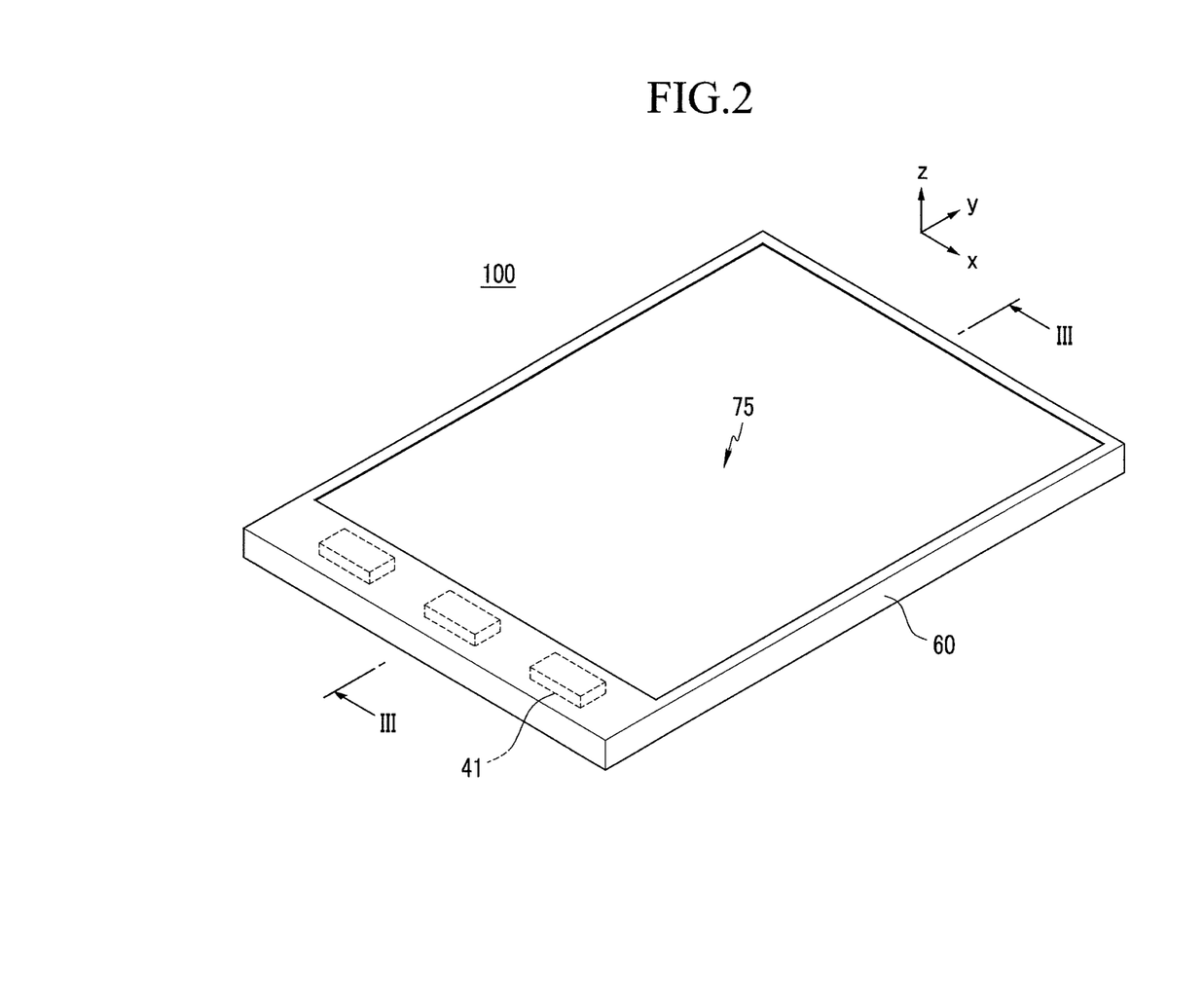
FIG. 2 shows a combined perspective view of a flat panel display according to a first exemplary embodiment.

FIG. 1 shows an exploded perspective view of a flat panel display 100 according to a first exemplary embodiment, and FIG. 2 shows a combined perspective view of the flat panel display 100 according to the first exemplary embodiment. Referring to FIG. 1 and FIG. 2, the flat panel display 100 includes a liquid crystal display (LCD). The flat panel display 100 includes a backlight assembly 40 for supplying light and a liquid crystal panel assembly 70 for receiving the light and displaying an image. Also, the flat panel display 100 includes a top chassis 60 for surrounding, fixing, and supporting the liquid crystal panel assembly 70 and the backlight assembly 40, a mold frame (frame or support frame) 62, and a bottom chassis 66.

The backlight assembly 40 guides and supplies light to a liquid crystal panel 75, and the liquid crystal panel assembly 70 provided on the backlight assembly 40 controls the liquid crystal panel 75 on which the image is displayed. The liquid crystal panel assembly 70 includes the liquid crystal panel 75, an integrated circuit (IC) chip 77, a protective layer 78, and a flexible printed circuit board (FPCB) 79. The protective layer 78 protects the integrated circuit chip 77 by surrounding the integrated circuit chip 77.

The liquid crystal panel 75 includes i) a TFT substrate 73 having a plurality of thin film transistors (TFT's) formed therein, ii) a color filter substrate 71 provided on the TFT substrate 73, and iii) liquid crystal (not shown) injected between the substrates 71 and 73. The integrated circuit chip 77 is installed on the TFT substrate 73 and controls the liquid crystal panel 75.

In one embodiment, the TFT substrate 73 is a transparent glass substrate on which thin film transistors are formed as a matrix, a source terminal is connected to a data line, and a gate terminal is connected to a gate line. In one embodiment, a pixel electrode of indium tin oxide (ITO) that is a transparent conductive material is formed at a drain terminal.

The data line and the gate line of the liquid crystal panel 75 are connected to the flexible printed circuit board (FPCB) 79. When an electrical signal, received from the flexible printed circuit board (FPCB) 79, is applied between a source terminal and a gate terminal of a TFT, the TFT is turned on or turned off, and an electrical signal for forming a pixel is output to the drain terminal. The integrated circuit chip 77 generates a data signal and a gate driving signal for driving the flat panel display 100 and a plurality of timing signals for applying the signals at appropriate times, and applies the gate driving signal and the data driving signal to the gate line and the data line of the liquid crystal panel 75, respectively.

The color filter substrate 71 is disposed on the TFT substrate 73. The color filter substrate 71 represents a substrate on which RGB pixels for manifesting colors when the light is passed through it are formed by a thin film process. In one embodiment, a common electrode of ITO is coated on the color filter substrate 71. When power is applied to the gate terminal and the source terminal of the TFT to turn on the thin film transistor, an electric field is formed between the pixel electrode and the common electrode of the color filter substrate 71. By the electric field, the alignment angle of the liquid crystal injected between the TFT substrate 73 and the color filter substrate 71 is changed and optical transmittance is changed by the changed alignment angle, thereby acquiring a desired pixel. A polarizing plate (not shown) may be attached on the surfaces of the color filter substrate 71 and the TFT substrate 73 to polarize the light.

Figure 3:
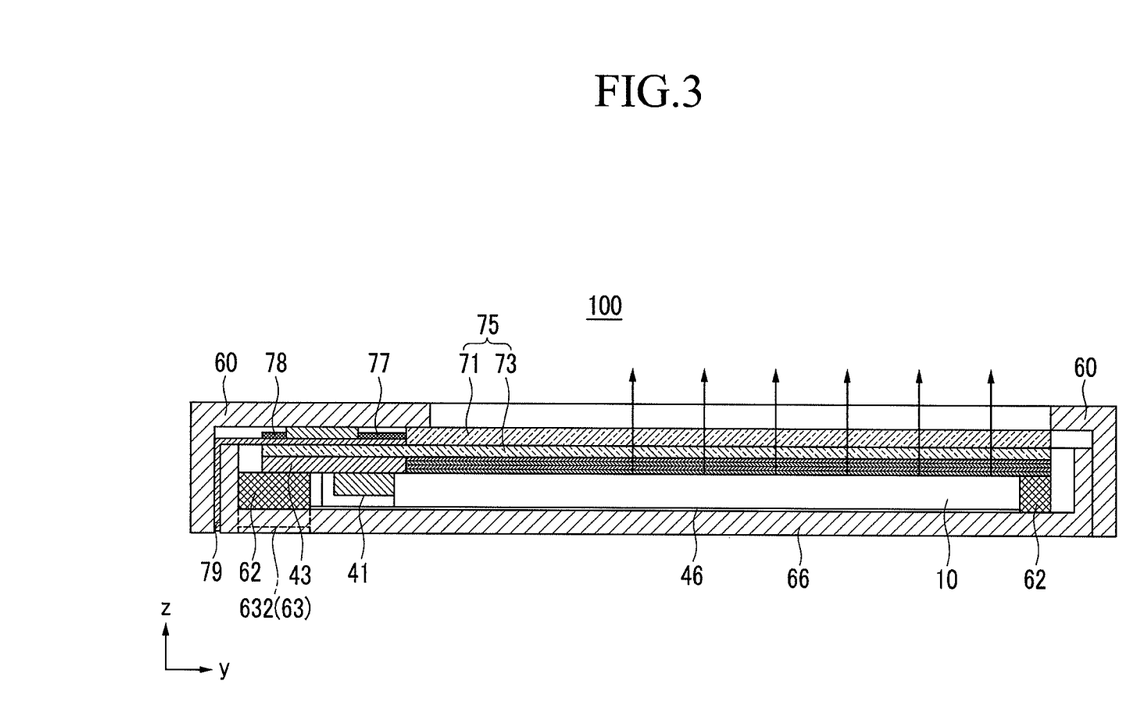
FIG. 3 shows a cross-sectional view with respect to the III-III line of FIG. 2.

FIG. 3 shows a cross-sectional view with respect to the III-III line of FIG. 2. Referring to FIG. 1 and FIG. 3, the backlight assembly 40 is provided at the bottom of the liquid crystal panel assembly 70, it is surrounded, fixed, and supported by the mold frame 62 so as to provide uniform light to the liquid crystal panel 75, and it is also received at the bottom chassis 66.

The backlight assembly 40 includes i) at least one light emitting diode 41 (shown with a dotted line), ii) a flexible printed circuit board (FPCB) 43, iii) a light guide panel 10, iv) a reflection sheet 46 and v) an optical sheet 48. The at least one light emitting diode 41 supplies light to the liquid crystal panel 75 as a light source. The flexible printed circuit board (FPCB) 43 provides power for generating light by driving the light emitting diode 41. The light guide panel 10 guides the light emitted by the light emitting diode 41 to the liquid crystal panel 75. The reflection sheet 46 is provided at the bottom front of the light guide panel 10 and reflects light. The optical sheet 48 acquires luminescence characteristics of light from the light emitting diode 41 and supplies light to the liquid crystal panel 75. FIG. 1 shows the light emitting diode as a light source, which exemplifies the light source of the exemplary embodiment, but the exemplary embodiment is not restricted thereto. Therefore, a light source other than the light emitting diode can be used, and other types of light sources such as a linear light source or a surface light source are also usable.

In FIG. 1, a printed circuit board (PCB) (not shown) is installed at the rear of the bottom chassis 66 and is connected to the flexible printed circuit board (FPCB) 79. The printed circuit board (PCB) converts an analog data signal into a digital data signal and supplies it to the liquid crystal panel 75. Further, the printed circuit board (PCB) (not shown) is connected to another flexible printed circuit board (FPCB) 43 and supplies power to the light emitting diode 41. The flexible printed circuit board (FPCB) 43 attached to the light emitting diode 41 is surrounded and supported by the mold frame 62 together with the light guide panel 10.

The top chassis 60 is installed in the liquid crystal panel assembly 70 by bending the flexible printed circuit board (FPCB) 79 to the outside of the mold frame 62 and be combined with the bottom chassis 66. Therefore, the liquid crystal panel assembly 70 can be fixed to the bottom chassis 66. Since one side of the light guide panel 10 faces the light emitting diode 41 that is the light source, when the light emitted by the light emitting diode 41 is input to the light guide panel 10, straightness of the light is improved to control the light to reach a light facing unit of the light guide panel 10 provided opposite to the light emitting diode 41.

The mold frame 62 includes a weight unit 63 at a place that is eccentric from the center of the liquid crystal panel assembly 70. For example, the weight unit 63 is protruded toward the bottom chassis 66 at the front of the mold frame 62 where the light emitting diode 41 is provided. Since one side of the flat panel display 100 is heavier than the other side due to the weight unit 63, when the flat panel display 100 falls, the display 100 is at least partially rotated along the weight center of the weight unit 63. As a result, damages to the liquid crystal panel assembly 70 are minimized by preventing the surface of the flat panel display 100 from touching the ground. In one embodiment, the weight unit 63 forms eccentricity for the liquid crystal panel assembly 70, and a material with a specific gravity that is greater than that of the mold frame 62 can be additionally formed and attached. The bottom chassis 66 includes a combining groove 67 formed corresponding to the weight unit 63 so that it may be combined with the weight unit 63 when receiving the mold frame 62.

The weight unit 63 includes a first weight unit 631 and a second weight unit 632 that are protruded toward the bottom chassis 66 from both ends of the flexible circuit board 43 in the width direction (x-axis direction). The first and second weight units 631, 632 may have the same or different weights with respect to each other. Also, the bottom chassis 66 includes a first combining groove 671 and a second combining groove 672 respectively corresponding to the first weight unit 631 and the second weight unit 632. When the mold frame 62 is received by the bottom chassis 66, the first weight unit 631 and the second weight unit 632 are combined with or at least partially receive the first combining groove 671 and the second combining groove 672, respectively. Therefore, since the flat panel display 100 touches the ground while being on it, the liquid crystal panel assembly 70 can be more efficiently protected compared to the case in which its surface touches the ground because the weight unit 63 is not installed. Also, the weight unit 63 can be formed by only one of the first and second weight units 631 and 632 (not shown). In this case, a point of the flat panel display 100 can touch the ground when it falls to the ground.

Figure 4:
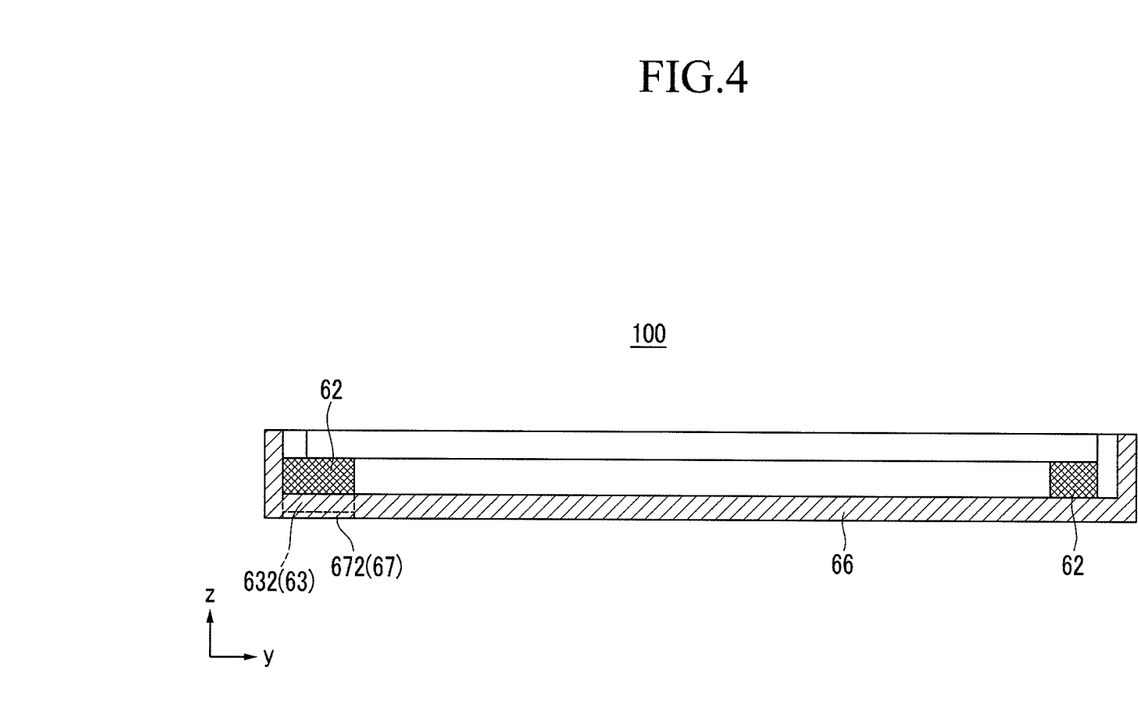
FIG. 4 shows a combined cross-sectional view of a mold frame and a bottom chassis shown in FIG. 3.

FIG. 4 shows a combined cross-sectional view of a mold frame and a bottom chassis shown in FIG. 3. In one embodiment, as shown in FIGS. 1, 3 and 4, the weight unit 63 or the first and second weight units 631 and 632 are formed at the bottom of the mold frame 62 as rectangular parallelepipeds. In another embodiment, the weight unit 63 or the first and second weight units 631 and 632 can have a shape (e.g., cylinder or cube or other polygonal shape) other than rectangular parallelepipeds. In this embodiment, the combining groove 67 or the first and second combining grooves 671 and 672 are formed as incised grooves corresponding to the weight unit 63 or second sides of the first and second weight units 631 and 632. The combining groove 67 of the bottom chassis 66 or the first and second combining grooves 671 and 672 can receive the mold frame 62 including the weight unit 63 or the first and second weight units 631 and 632.

Figure 5:
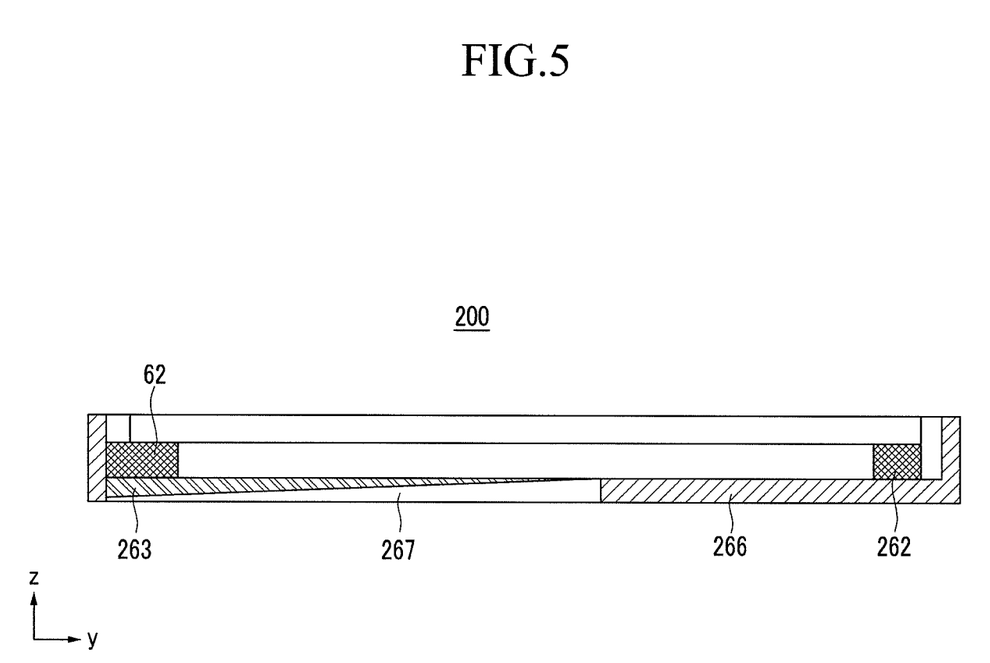
FIG. 5 shows a combined cross-sectional view of a mold frame and a bottom chassis in a flat panel display according to a second exemplary embodiment.

FIG. 5 shows a combined cross-sectional view of a mold frame and a bottom chassis in a flat panel display according to a second exemplary embodiment. Referring to FIG. 5, in the flat panel display 200, a weight unit 263 is protruded as an oblique line toward a bottom chassis 266 with the side that becomes narrower from the front to the rear of a mold frame 262 in the up and down direction to form eccentricity for the liquid crystal panel assembly 70, and it is combined with a combining groove 267 formed in the bottom chassis 266. The combining groove 267 is formed as an incised groove corresponding to the second side of the weight unit 263. The combining groove 267 of the bottom chassis 266 can receive the mold frame 262 including the weight unit 263. Also, the weight unit 263 can be additionally formed and attached by using a material with a specific gravity that is greater than that of the mold frame 262. When the flat panel display 200 falls, the front part of the mold frame 262 corresponding to the weight unit 263 touches the ground and minimizes damage to the liquid crystal panel assembly 70. The weight unit 263 according to the second exemplary embodiment can be installed at both front sides or one side of the mold frame 262.

Figure 6:
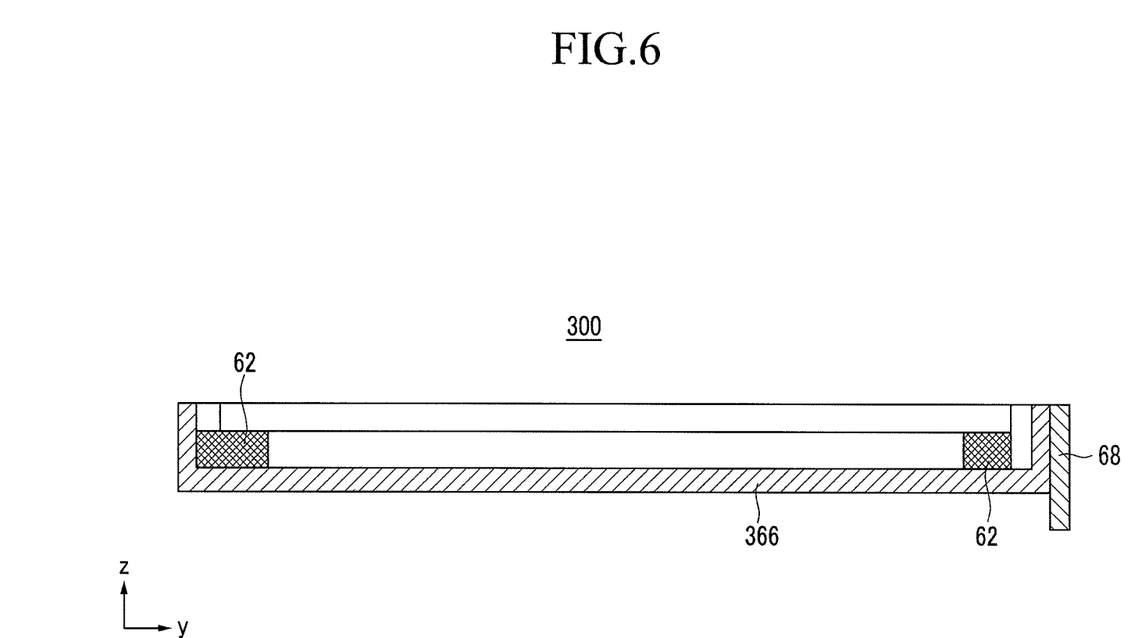
FIG. 6 shows a combined cross-sectional view of a mold frame and a bottom chassis in a flat panel display according to a third exemplary embodiment.

FIG. 6 shows a combined cross-sectional view of a mold frame and a bottom chassis in a flat panel display according to a third exemplary embodiment. Referring to FIG. 6, in the flat panel display 300, a weight unit 68 is attached to a bottom chassis 366 at a place that is eccentric from the middle of the liquid crystal panel assembly 70. For example, the weight unit 68 is attached to the external surface of the bottom chassis 366 at the rear of the bottom chassis 366 where the light emitting diode 41 is provided. The weight unit 68 is formed according to the external surface of the bottom chassis 366 to be protruded over the ground of the bottom chassis 366. Also, the weight unit 68 can be additionally formed and attached with a material having a specific gravity that is greater than that of the bottom chassis 366. When the flat panel display 300 falls, the rear part of the bottom chassis 366 corresponding to the weight unit 68 touches the ground and damage to the liquid crystal panel assembly 70 is minimized.

Figure 7:
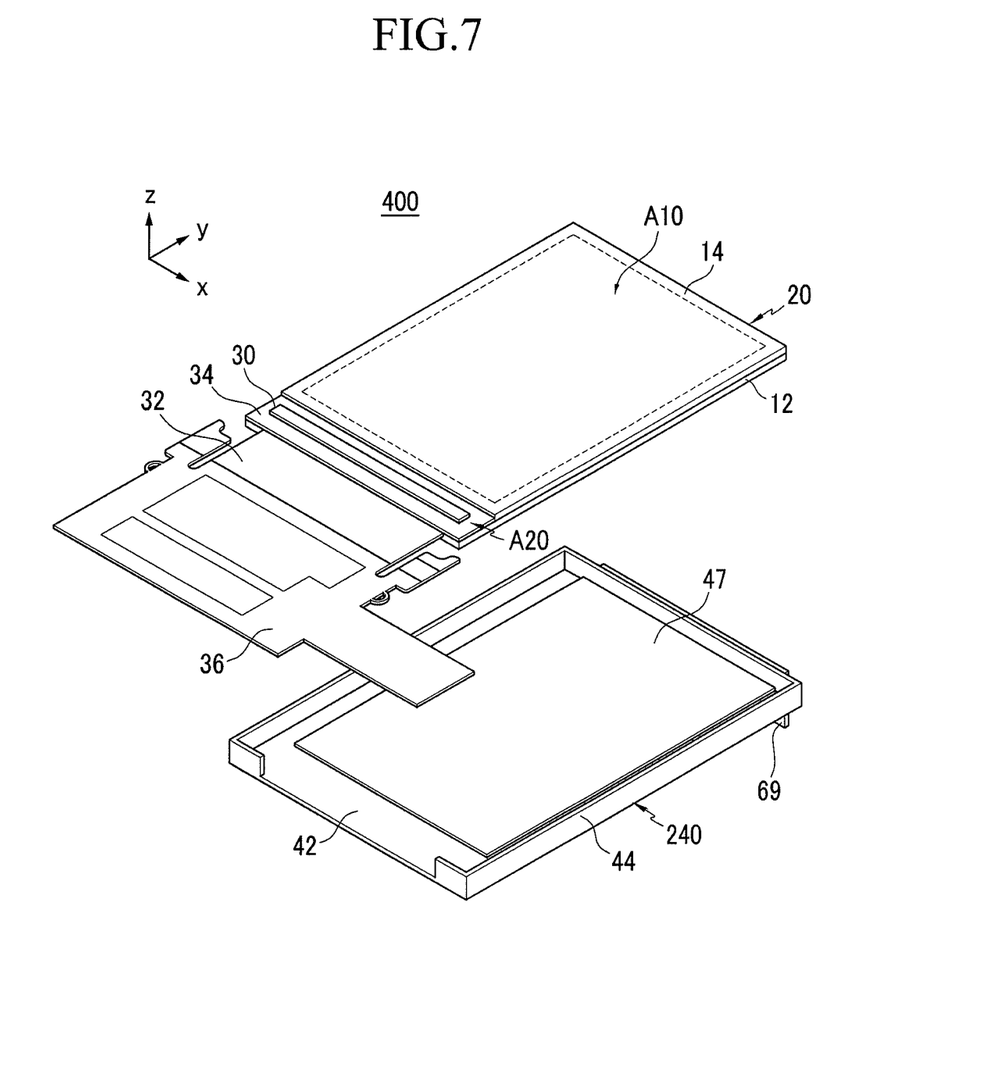
FIG. 7 shows an exploded perspective view of a flat panel display according to a fourth exemplary embodiment.
Figure 8:
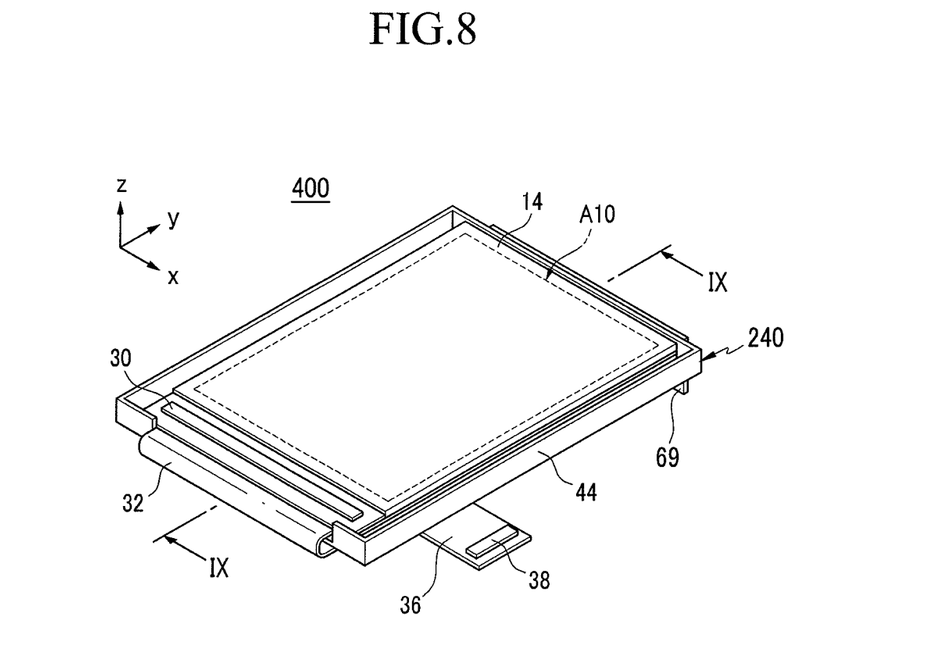
FIG. 8 shows a combined perspective view of a flat panel display according to the fourth exemplary embodiment.

FIG. 7 shows an exploded perspective view of a flat panel display according to a fourth exemplary embodiment, and FIG. 8 shows a combined perspective view of the flat panel display according to the fourth exemplary embodiment. Referring to FIG. 7 and FIG. 8, the flat panel display 400 includes an organic light emitting diode (OLED) display. The flat panel display 400 includes an organic light emitting panel assembly 20, a chassis 240 combined with the organic light emitting panel assembly 20 in the rear of the panel assembly 20, and a printed circuit board (PCB) 36 electrically connected to the panel assembly 20 through a flexible printed circuit board (FPCB) 32. The organic light emitting panel assembly 20 includes a display area A10 and a pad area A20, and displays a predetermined image in the display area A10.

The organic light emitting panel assembly 20 includes a first substrate 12 and a second substrate 14. The second substrate 14 is formed to be smaller than the first substrate 12, and an edge of the second substrate 14 is fixed to the first substrate 12 by a sealant (not shown). The display area A10 displays a real image in the overlapped area of the first substrate 12 and the second substrate 14, and is provided inside the sealant. The pad area A20 is provided above the first substrate 12 outside the sealant.

The RGB pixels are disposed in the display area A10 of the first substrate 12 in a matrix format, and a scan driver (not shown) and a data driver (not shown) for driving the pixels are provided between the display area A10 and the sealant, or outside the sealant. Pad electrodes for transmitting electrical signals to the scan driver and the data driver are provided in the pad area A20 of the first substrate 12.

The second substrate 14 is attached to the first substrate 12 by the sealant with a predetermined gap therebetween, and seals and protects the driving circuits and the organic light emitting elements formed on the first substrate 12. In the organic light emitting panel assembly 20, the first substrate 12 becomes the lower substrate and the second substrate 14 becomes the upper substrate.

An integrated circuit chip 30 is installed in the pad area A20 by the chip on glass (COG) method. The flexible printed circuit board (FPCB) 32 is installed by the chip on film (COF) method. A protective layer 34 is formed near the integrated circuit chip 30 and the flexible printed circuit board (FPCB) 32 to cover and protect the pad electrodes that are formed in the pad area A20.

The printed circuit board (PCB) 36 includes electronic elements (not shown) for processing the driving signals, and includes a connector 38 for receiving external signals. One side of the flexible printed circuit board (FPCB) 32 is fixed to the pad area A20, and the other side thereof is connected to the printed circuit board (PCB) 36 on the rear side of the chassis 240. That is, the flexible printed circuit board (FPCB) 32 allows the printed circuit board (PCB) 36 to be provided on the rear of the chassis 240.

In the present exemplary embodiment, the chassis 240 includes i) a bottom 42 on which the organic light emitting panel assembly 20 is provided, and ii) side walls 44 facing the side walls of the organic light emitting panel assembly 20. The side walls 44 are extended from the edge of the bottom 42 toward the organic light emitting panel assembly 20 to face the side surfaces of the organic light emitting panel assembly 20. The bottom 42 of the chassis 240 and the first substrate 12 of the organic light emitting panel assembly 20 are adhered by an adhesive tape 47 provided therebetween. That is, the organic light emitting panel assembly 20 is fixed to the chassis 240.

Figure 9:
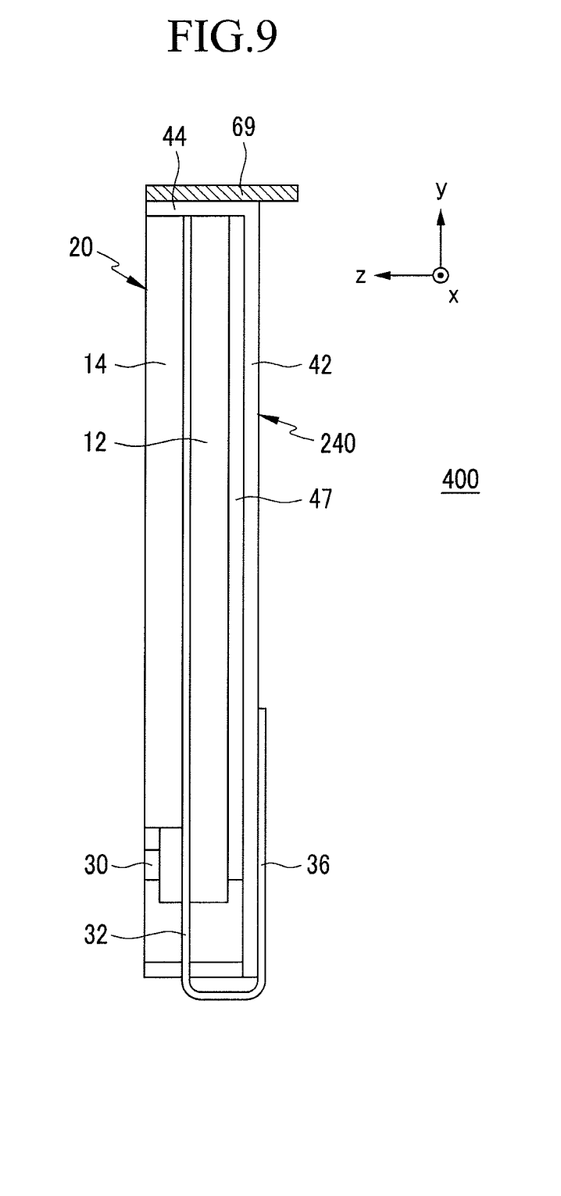
FIG. 9 shows a cross-sectional view with respect to the IX-IX line of FIG. 8.

FIG. 9 shows a cross-sectional view with respect to the IX-IX line of FIG. 8. Referring to FIG. 7 to FIG. 9, the chassis 240 forms a weight unit 69 at a place that is eccentric from the middle of the organic light emitting panel assembly 20. For example, the weight unit 69 is attached to the external surface of the side wall 44 of the chassis 240 in the rear of the chassis 240 where the pad area A20 is provided. The weight unit 69 is formed along the external surface of the side wall 44 of the chassis 240 and is protruded above the bottom 42 of the chassis 240. Also, the weight unit 69 can be additionally formed and attached with a material having a specific gravity that is greater than that of the chassis 240. Since the weight unit 69 at least partially rotates the flat panel display 400 when the flat panel display 400 falls, the rear part of the chassis 240 corresponding to the weight unit 69 touches the ground and the flat panel display 400 and the damage to the organic light emitting panel assembly 20 is minimized.

Figure 10:
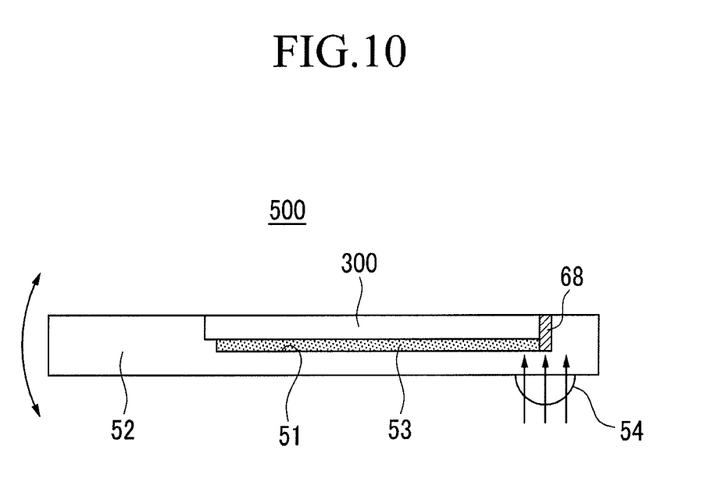
FIG. 10 shows a cross-sectional view of a mobile device using a flat panel display of the exemplary embodiment.

FIG. 10 shows a cross-sectional view of a mobile device using a flat panel display of the exemplary embodiment. Referring to FIG. 10, the mobile device 500 includes one of the flat panel displays 100, 200, 300, and 400 according to the first to fourth exemplary embodiments. For convenience, the mobile device 500 will be described with the example of the configuration to which the flat panel display 300 according to the third exemplary embodiment is applied.

The mobile device 500 includes a flat panel display 300 and a body 52 including an installing groove 51 for installing the flat panel display 300. Since the flat panel display 300 includes a weight unit 68 at the place that is eccentric from the middle of the liquid crystal panel assembly 70, the mobile device 500 forms an eccentric configuration for the middle of the liquid crystal panel assembly 70.

When the mobile device 500 falls, the weight unit 68 at least partially rotates the mobile device 500 to prevent the surface of the mobile device 500 from touching the ground, and thereby prevents the flat panel display 300 from being vibrated or bent. Therefore, cracks and damage to the liquid crystal panel assembly 70 by the drop impact are reduced.

Also, the mobile device 500 can further form another weight unit 54 in the body 52. The weight unit 54 formed in the body 52 can at least partially rotate the mobile device 500 when the mobile device 500 additionally has the weight unit 68 formed in the flat panel display 300. In this instance, the weight unit 54 of the body 52 is formed at a place where eccentricity of the weight unit 68 of the flat panel display 300 is not offset. Also, the weight unit 54 can be additionally formed and attached with a material having a specific gravity that is greater than that of the body 52. For example, the weight unit 54 of the body 52 is formed at the place corresponding to the weight unit 68 of the flat panel display 300. That is, the weight unit 54 is attached to the external surface of the bottom of the body 52 corresponding to the rear of the bottom chassis 366 where the light emitting diode 41 is provided. Also, when the weight unit 54 is formed in the body 52, a weight unit 68 (not shown) may not be formed in the flat panel display 300.

The body 52 receives the flat panel display 300 into the installing groove 51, and the flat panel display 300 and the surface of the installing groove 51 can form a buffer space therebetween. The buffer space buffers and absorbs the impact that is given to the body 52 when the mobile device 500 falls, in addition to its rotation. Further, the body 52 can fill a buffer member 53 in the buffer space. The buffer member 53 further absorbs the impact transmitted to the installing groove 51 to protect the flat panel display 300.

According to at least one embodiment, a weight unit is installed in a mold frame or a chassis so as to be eccentric from the center of a liquid crystal panel or organic light emitting panel assembly, and so when a flat panel display or a mobile device is dropped, it is at least partially rotated to prevent vibration to or bending of the panel assembly. Therefore, cracks and damage to the structure caused by the falling impact are reduced.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A flat panel display comprising:
a liquid crystal panel assembly configured to display an image;
a backlight assembly including i) a light source configured to provide light to the liquid crystal panel assembly, ii) a flexible printed circuit board (FPCB) configured to provide power for the light source to generate the light, and iii) a light guide panel configured to guide the light received from the light source;
a mold frame surrounding the flexible printed circuit board;
a chassis accommodating the mold frame; and
a weight unit formed in at least one of the chassis and mold frame, wherein the weight unit is formed at a place that is eccentric with respect to the center of the liquid crystal panel assembly.

2. The flat panel display of claim 1, wherein the weight unit is formed only in the mold frame.

3. The flat panel display of claim 2, wherein the weight unit protrudes toward the chassis in the rear of the mold frame where the light source is formed.

4. The flat panel display of claim 3, wherein a combining groove is defined in the chassis, wherein the combining groove corresponds to the weight unit and is configured to at least partially receive the weight unit.

5. The flat panel display of claim 3, wherein the weight unit comprises a first weight unit and a second weight unit that protrudes toward the chassis from both width-direction ends of the flexible printed circuit board.

6. The flat panel display of claim 5, wherein first and second combining grooves are defined in the chassis, and wherein the first and second combining grooves are configured to at least partially receive the first and second weight units, respectively.

7. The flat panel display of claim 3, wherein the weight unit has a rectangular parallelepiped shape, and wherein the combining groove is formed as an incised groove corresponding to a side of the weight unit.

8. The flat panel display of claim 3, wherein the weight unit is protruded as an oblique line from the front to the rear of the mold frame, and wherein the combining groove is formed as an incised groove corresponding to a side of the weight unit.

9. The flat panel display of claim 1, wherein the light source is attached to the flexible printed circuit board, and wherein the mold frame is configured to reflect light that has leaked from a side of the light guide panel.

10. The flat panel display of claim 1, wherein the weight unit is formed only in the chassis.

11. The flat panel display of claim 10, wherein the weight unit is attached to an external surface of the chassis in the rear of the chassis where the light source is formed.

12. The flat panel display of claim 11, wherein the weight unit is formed along the external surface of the chassis and is protruded above a bottom of the chassis.

13. A flat panel display comprising:
an organic light emitting panel assembly including a display area and a pad area;
a chassis configured to support the organic light emitting panel assembly; and
a weight unit formed in the chassis to be eccentric with respect to a weight center of the organic light emitting panel assembly.

14. The flat panel display of claim 13, wherein the weight unit is attached to an external surface of a side wall of the chassis in the rear of the chassis where the pad area is formed.

15. The flat panel display of claim 14, wherein the weight unit is formed along the external surface of the chassis and is protruded above the bottom of the chassis.

16. A mobile device comprising:
- a flat panel display comprising i) a display panel assembly, ii) a support structure configured to support the display panel assembly and iii) a weight unit formed in the support structure to be eccentric with respect to a weight center of the display panel assembly; and
- a body configured to accommodate the flat panel display.

17. The mobile device of claim 16, wherein an installing groove is defined in the body, wherein the installing groove of the body is configured to receive the display panel assembly, and wherein a buffer member is interposed between the flat panel display and a surface of the installing groove.

18. The mobile device of claim 16, further comprising an additional weight unit formed in the body, wherein the additional weight unit is configured to increase the eccentricity.

19. The mobile device of claim 16, wherein the display panel assembly is a liquid crystal panel assembly, wherein the support structure comprises a mold frame and a chassis, and wherein the weight unit is formed in at least one of the chassis and mold frame.

20. The mobile device of claim 16, wherein the display panel assembly is an organic light emitting panel assembly, wherein the support structure comprises a chassis, and wherein the weight unit is formed in the chassis.

\* \* \* \* \*